United States Patent Office 3,384,662
Patented May 21, 1968

3,384,662
1,1-DIPHENYL-1-METHOXY-3-BENZYLAMINO-
PROPANE AND THE SALTS THEREOF
Roderich Höllinger and Wolf Wendtlandt, Linz, Austria,
assignors to Österreichische Stickstoffwerke Aktienge-
sellschaft, Linz, Austria
No Drawing. Filed Mar. 22, 1966, Ser. No. 536,313
Claims priority, application Austria, Mar. 25, 1965,
A 2,703/65
2 Claims. (Cl. 260—570)

ABSTRACT OF THE DISCLOSURE 1,1-diphenyl-1-methoxy - 3 - benzylaminopropane and acid addition salts thereof with non-toxic acids which have analgesic properties.

---

This invention relates to aminopropane derivatives and to a process for the preparation thereof.

More particularly the present invention provides the compound 1,1-diphenyl-1-methoxy - 3 - benzylaminopropane, acid addition salts thereof and a process for the preparation thereof.

The compound 1,1-diphenyl-1-methoxy-3-benzylaminopropane and its acid addition salts with non-toxic acids exhibit interesting pharmacological properties. They possess an analgesic effect. This effect is not as strong as for morphine or similar compounds which can only be administered under strict medical control; rather, the compounds of this invention are analgesics having a weaker effect which is not habit-forming, and which is especially suited to the treatment of pain of all types in daily life and outside the control of doctors. This distinguishes the analgesic of the invention from the known analgesics of the diphenylmethane series. If the compound is administered to humans in individual doses of 15 mg., in the form of tablets, then a good analgesic effect which lasts for three to four hours is produced. No deleterious effects on blood picture or urine analysis have been found even on prolonged administration.

Accordingly, the invention also provides an analgesically-active composition which comprises, as the active constituent, 1,1-diphenyl-1-methoxy - 3 - benzylaminopropane or a non-toxic acid addition salt thereof, and a pharmacologically acceptable carrier.

The 1,1-diphenyl-1-methoxy-3-benzylaminopropane or an acid addition salt thereof may be prepared from a basic ether of the formula:

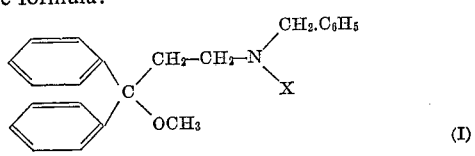

(I)

in which X is a hydrogenolytically removable residue, such as the benzyl or benzhydryl residue, or a salt thereof, by removing the hydrogenolytically removable residue by treatment with hydrogen in the presence of a metal catalyst, and, if desired, subsequently converting the resulting base into a salt or liberating the base from the resulting salt.

A noble metal catalyst such as palladium charcoal is preferably used for the reduction. The best results are obtained if the starting compound of Formula I is used in the form of a salt, for example the hydrochloride. All normal process methods for removing hydrogenolytically removable residues are inherently also suitable for the present case.

The product of the process is isolated by the usual methods, the catalyst being filtered off and the solvent distilled off. The base which is thereby produced may subsequently be converted into a salt. If the reaction directly yields a salt, for example a hydrogen halide salt, then the free base as well as the salts with other acids can be obtained therefrom. As salts with other acids there may, for example, be mentioned sulphates, nitrates, succinates, toluenesulphonates, mandelates, or tartrates.

The N-disubstituted ethers of Formula I which serve as starting materials, are new. They may be obtained by reaction of benzhydryl methyl ether with an alkali metal amide in liquid ammonia as the solvent, and subsequent condensation of the resulting C-alkali metal compound with an N-disubstituted aminoethyl halide of the formula:

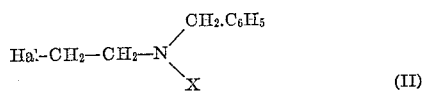

(II)

in which Hal is a halogen atom and X is as defined as above, with liquid ammonia here again serving as the solvent.

The following example illustrates the present invention:

EXAMPLE 159 g. of 1,1-diphenyl-1-methoxy-3-dibenzylaminopropane hydrochloride are suspended in 900 cc. of alcohol and hydrogenated with hydrogen at room temperature in the presence of 10 g. of 10% palladium charcoal as the catalyst, during which process the solids gradually go into solution. After 1 mole equivalent of hydrogen has been taken up the hydrogenation is interrupted, the catalyst filtered off and the solvent distilled off. The residue so obtained is recrystallised from alcohol. 108 g. of 1,1-diphenyl-1-methoxy - 3 - benzylaminopropane hydrochloride are obtained, corresponding to a yield of 85% of theory. Melting point 186.5° to 188° C. The base, which is obtained by the usual methods, has a melting point of 68° to 69° C. The following salts may be obtained from this base by reaction with the appropriate acids:

| | Melting point, ° C. |
|---|---|
| Nitrate | 133 to 134.5 |
| D-tartrate | 150 to 151 |
| D,L-malate | 153 to 155 |
| Succinate | 142 to 144 |
| Cyclohexylsulphamate | 127 to 129 |
| L-mandelate | 134 to 135.5 |

The 1,1 - diphenyl-1-methoxy-3-dibenzylaminopropane hydrochloride used as the starting material is obtained by reaction of benzhydryl methyl ether with potassium amide in liquid ammonia followed directly by condensation with 1-dibenzylamino-2-chlorethane. The isolation of the desired ether in the form of the hydrochloride is achieved by acidifying with hydrochloric acid the reaction product obtained after distilling off the ammonia, and filtering off the hydrochloride. The latter has a melting point of 186° to 188° C.

We claim:
1. 1,1-diphenyl-1-methoxy - 3 - benzylaminopropane or acid addition salts thereof with non-toxic acids.
2. 1,1-diphenyl-1-methoxy-3 - benzylaminopropane hydrochloride.

References Cited

UNITED STATES PATENTS 3,157,656   11/1964   Krapcho _____ 260—570 XR

FOREIGN PATENTS

White et al.: "Brit. J. Pharmacol," vol. 6, pp. 560–71 (1951).

CHARLES B. PARKER, Primary Examiner.

R. V. HINES, Examiner.